United States Patent [19]

Arakawa

[11] Patent Number: 4,629,962
[45] Date of Patent: Dec. 16, 1986

[54] BATTERY CHARGING DEVICE

[75] Inventor: Koji Arakawa, Kawagoe, Japan

[73] Assignee: Toko, Inc., Tokyo, Japan

[21] Appl. No.: 748,826

[22] Filed: Jun. 26, 1985

[30] Foreign Application Priority Data

Jun. 26, 1984 [JP] Japan ............................... 59-94469[U]

[51] Int. Cl.$^4$ ........................................... H01M 10/46
[52] U.S. Cl. ........................................ 320/2; 429/98; 320/4
[58] Field of Search ........................................ 320/2–5; 429/96–100

[56] References Cited

U.S. PATENT DOCUMENTS

| 2,418,141 | 4/1947 | Salazar | 320/4 X |
| 2,478,887 | 8/1949 | Nelson | 429/100 X |
| 2,505,614 | 4/1950 | Gilbert et al. | 320/4 |
| 2,589,071 | 3/1952 | Galasso | 429/98 |
| 3,344,334 | 9/1967 | Rubin | 320/2 |
| 4,138,531 | 2/1979 | Thompson | 429/98 |

Primary Examiner—R. J. Hickey

[57] ABSTRACT

In a battery charging device, terminals for supplying a charging current to a battery to be charged are provided on one side wall of the device body, and a closure member is provided to be movable like a drawer. When the closure member is drawn out, at least one opening is defined between the closure member and said one side wall so that the battery can be inserted and held therein to be charged.

3 Claims, 7 Drawing Figures

BATTERY CHARGING DEVICE

BACKGROUND OF THE DISCLOSURE

1. Field of the Invention

This invention relates to a battery charging device, and more particularly it pertains to a miniaturized and portable battery charging device for charging a chargeable battery such as nickel-cadmium battery which has been employed as power source for portable domestic appliances such as, for example, video tape recorder, radio transmitter/receiver, television receiver and so forth.

2. Background of the Invention

In order to have a better understanding of the present invention, description will first be made of the prior art invention illustrated in FIGS. 1 to 3 of the accompanying drawings. Referring to FIG. 1, there is shown a battery 2 having a pair of connecting terminals 1 exposed through the surface of the box-like body thereof. It is often the case that such a battery is employed with portable domestic appliances such as mentioned above. Referring to FIG. 2, there is shown a battery charging device which has conventionally been used to charge the battery 2.

The battery charging device shown in FIG. 2 comprises a body 4 from which a power cord 3 extends which has a plug attached at the free end thereof for connection with commercial power source; a frame-like adaptor 7 coupled to the body 4 through a cord 5 and which is formed with an opening 6 through which the battery 2 can be inserted in the adaptor; and a pair of connecting terminals 8 provided in the opening 6 thereof for supplying a charging current to the battery 2. When the battery 2 is inserted and held in the opening 6, the connecting terminals 1 of the battery 2 are disposed in contact with the connecting terminals 8 provided in the opening 6 to establish an electrical connection through which a charging current can be supplied to the battery 2.

Another type of battery charging device such as shown in FIG. 3 has also heretofore been employed which comprises a body 4 provided with an extension which is formed with an opening 6. In the opening 6, a pair of connecting terminals 8 are provided so that when the battery 2 is inserted and held in the opening 6, the connecting terminals 1 and 8 are disposed in contact with each other so that the battery can be charged.

With the battery charging device shown in FIG. 2, however, due to the fact that the frame-like adaptor 7 which is separate from the body 4, inconvenience is experienced in carrying or manipulating the device. The battery charging device shown in FIG. 3 is also disadvantageous in that inconvenience is encountered in carrying the same since the body 4 thereof is large-sized due to the fact that the body 4 has the extension in which the opening 6 is formed. Furthermore, each of the conventional devices requires a closure or the like for covering the opening 6 to protect the connecting terminals 8.

SUMMARY OF THE INVENTION

The present invention has been made to obviate the various drawbacks of the above-described prior-art battery charging devices. According to an aspect of the present invention, there is provided a battery charging device wherein connecting terminals are provided on one side wall of the device body for supplying a charging current to a battery or batteries; and a drawer-like closure member is provided at the side of said one side wall in such a manner that when the closure member is drawn out, an opening is defined between the closure member and said one side wall of the device body so that the battery can be inserted and held therein.

The closure member is adapted to serve as a protective member for the connecting terminals when it assumes a first position where the closure member is disposed in close contact with or adjacent to said one side wall of the device body in such a manner as to cover the side wall. The closure member is also adapted to serve as a part of a frame for supporting the battery when the closure member assumes a second position spaced apart from said one side wall of the device body.

It is an object of the present invention to provide a battery charging device which is so miniaturized as to be handy to carry.

Another object of the present invention is to provide a battery charging device which is so designed that except when a battery is held at a position to be charged, terminals for connection to the battery are covered by a closure member so as to be prevented from mechanical/electrical deterioration which would otherwise occur.

Still another object of the present invention is to provide a battery charging device which is so designed that a plurality of batteries can be charged at the same time.

DESCRIPTION OF THE PREFERRED EMBODIMENTS

Figure 1:
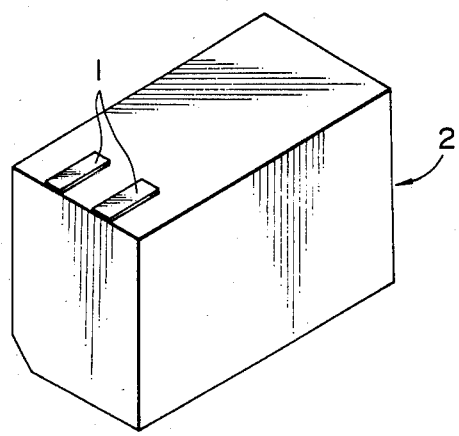
FIG. 1 is a perspective view of a battery which can be charged by using the prior-art battery charging device or the one according to the present invention.
Figure 3:
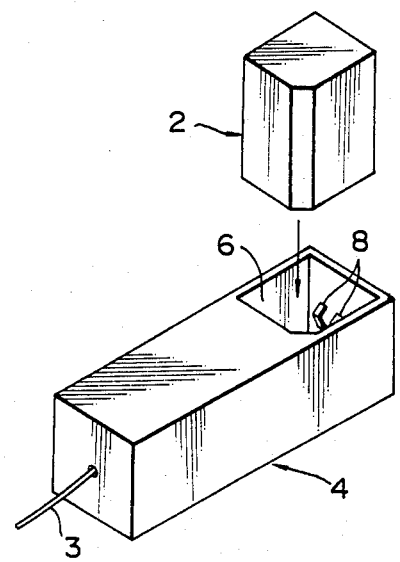
FIGS. 2 and 3 are perspective views showing the conventional battery charging devices.
Figure 2:
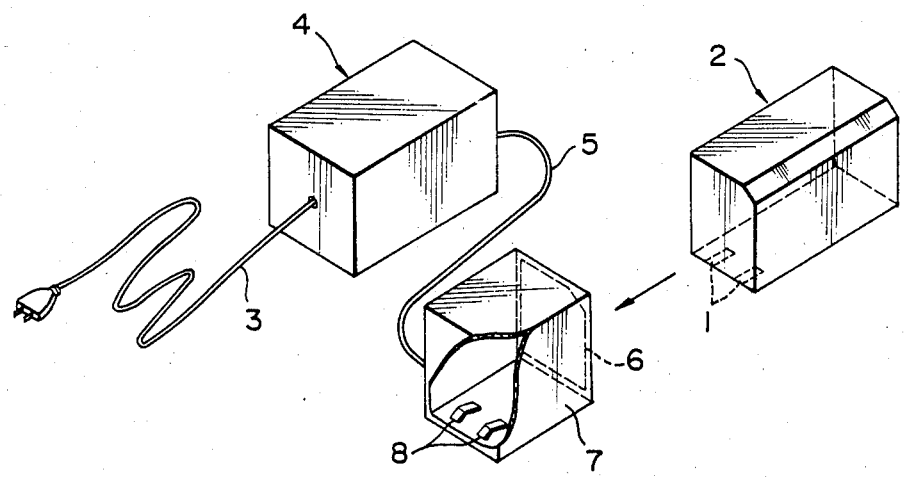
Figure 4:
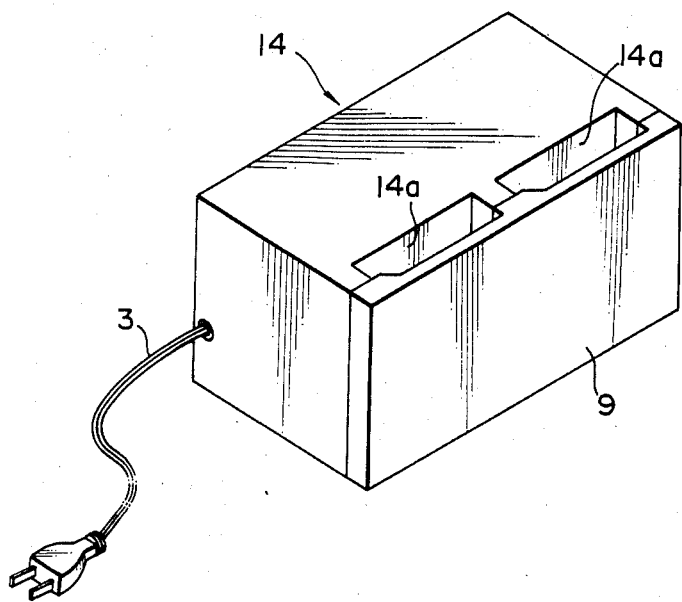
FIG. 4 is a perspective view illustrating the battery charging device according to an embodiment of the present invention, with the closure member thereof being disposed at a retracted position.
Figure 5:
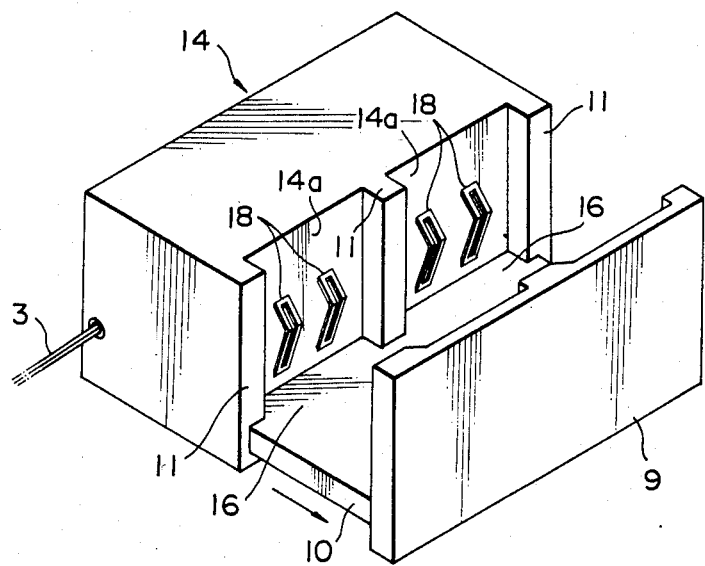
FIG. 5 is a perspective view showing the device of FIG. 4, with the closure member being drawn out.
Figure 6:
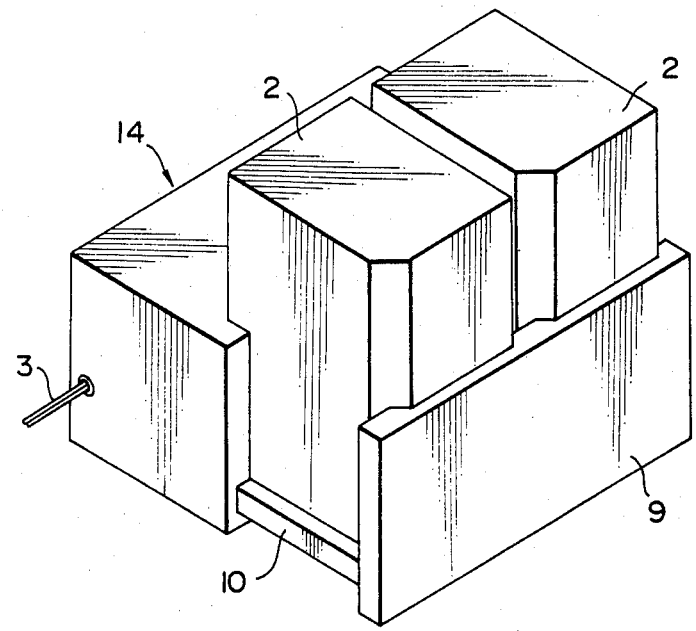
FIG. 6 is a perspective view showing the manner in which the battery charging device shown in FIG. 5 holds a plurality of batteries at positions to be charged.

Referring to FIGS. 4 and 5, there is illustrated the battery charging device according to a first embodiment of the present invention, which comprises a device body 14 having a power cord 3 attached thereto; and a closure member 9 provided at the side of one side wall 14a of the device body 14. The closure member 9 is mounted on a bottom plate 10 which can be drawn out of the device body 14 at right angles with respect to the side wall 14a. More specifically, the closure member 9 is arranged to be movable, like a drawer, between a first position where the closure member is disposed in close contact with or adjacent to the side wall 14a of the device body 14 as shown in FIG. 4, and a second position where the closure member 9 is spaced apart from the side wall 14a as shown in FIG. 5. When the closure member 9 is made to assume the second position, openings 16 are defined between the closure member 9 and the side wall 14a of the device body 14 so that batteries 2 can be inserted and held therein. Provided on the side wall 14a are connecting terminals 18 for supplying a charging current to the batteries 2. As will be seen from FIG. 4, the connecting terminals 18 are protectively covered by the closure member 9 when the latter assumes the first position. In this embodiment, to make it possible to charge two batteries at the same time, two pairs of connecting terminals 18 are provided, and the side wall 14a of the device body 14 is provided with means such as ridges 11 for permitting two batteries to be inserted and held in the openings 16. Furthermore, means is provided, though not shown, for retaining the closure member 9 at a predetermined position when the closure member 9 is drawn out of the device body 14. The predetermined position is chosen such that when the batteries 2 are inserted in the openings 16, the connecting terminals 1 provided on the batteries are pressed against the connecting terminals 18 provided on the device body 14. FIG. 6 shows how the batteries 2 are held at the charging positions.

Figure 7:
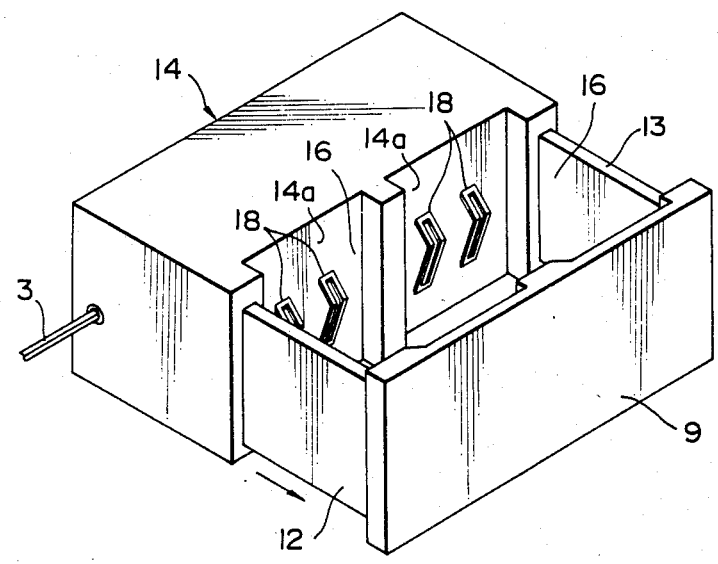
FIG. 7 is a perspective showing the battery charging device according to another embodiment of the present invention, with the closure member thereof being drawn out.

Referring to FIG. 7, there is shown the battery charging device according to a second embodiment of the present invention, which is similar to FIG. 5, except that in place of the bottom plate 10, two side plates 12 and 13 are provided at the opposite sides of the side wall 14a of the device body 14 in such a manner that they can be drawn out of the device body 14 at right angles with respect to the side wall 14a, and the closure member 9 is supported by the side plates 12 and 13. The embodiment of FIG. 7 is also similar to that of FIGS. 4 and 5 in that when the closure member 9 is disposed in contact with the device body 14, such a state as shown in FIG. 4 occurs, while when the closure member 9 is drawn out, openings 16 are defined between the side wall 14a of the device body 14 and the closure member 9 so that batteries 2 can be inserted and held therein.

As will be appreciated from the foregoing description, according to the present invention, by drawing the closure member 9 away from the side wall 14a of the device body 14, the openings 16 are defined in which batteries 2 can be inserted and held to be charged. When no charging operation is to be performed, the closure member 9 is retracted with respect to the device body 14 as shown in FIG. 4 so that the device turns out handy to carry. At the retracted position, the closure member 9 covers and protects the connecting terminals 18 provided on the side wall 14a of the device body 14; thus, the connecting terminals 18 can be prevented from mechanical/electrical deterioration which would otherwise be caused. Furthermore, the battery charging device according to the present invention can readily be adapted for charging a number of batteries at the same time, instead of two batteries as in the aforementioned embodiments. Specifically, to make it possible to charge four batteries at the same time, for example, connecting terminals 18 and a closure member 9 which may be similar to those mentioned above, may also be provided on the side wall opposite to the side wall 14a of the device body 14.

While the present invention has been illustrated and described with respect to some specific embodiments thereof, it is to be understood that the present invention is by no means limited thereto but encompasses all changes and modifications which will become possible within the scope of the appended claims.

I claim:

1. A battery charging device adapted for charging a battery having a pair of connecting terminals provided on and exposed at the outer surface thereof, comprising:
    a drawer-like closure member provided to be movable between a first position where said closure member is disposed in close contact with or adjacent to one side wall of the device body wherein said closure member is retracted with respect to said body and said device is reduced in size, and a second position where the closure member is spaced apart from said one side wall, so that the device is enlarged in size, wherein when said closure member is made to assume said second position, at least one opening is defined between said closure member and said one side wall so that the battery can be inserted and held therein; and
    at least one pair of connecting terminals provided on said one side wall and adapted, when the battery is inserted and held in said opening, to be disposed in electrical contact with the connecting terminals of the battery so that the latter can be charged.

2. A battery charging device according to claim 1, wherein said closure member is mounted on a bottom plate which can be drawn out of said device body at right angles with respect to said one side wall.

3. A battery charging device adapted for charging a battery having a pair of connecting terminals provided on and exposed at the outer surface thereof, comprising:
    a closure member provided to be movable between a first position where said closure member is disposed in close contact with or adjacent to one side wall of the device body, and a second position where the closure member is spaced apart from said one side wall, said closure member being mounted on two side plates which can be drawn out of the device body at right angles with respect to said one side wall, wherein when said closure member is made to assume said second position, at least one opening is defined between said closure member and said one side wall so that the battery can be inserted and held therein; and
    at least one pair of connecting terminals provided on said one side wall and adapted, when the battery is inserted and held in said opening, to be disposed in electrical contact with the connecting terminals of the battery so that the latter can be charged.

* * * * *